US012385475B2

(12) United States Patent
Wada et al.

(10) Patent No.: US 12,385,475 B2
(45) Date of Patent: Aug. 12, 2025

(54) RECIPROCATING COMPRESSOR

(71) Applicant: KOBE STEEL, LTD., Hyogo (JP)

(72) Inventors: Daisuke Wada, Takasago (JP); Naofumi Kanei, Takasago (JP)

(73) Assignee: KOBE STEEL, LTD., Hyogo (JP)

( * ) Notice: Subject to any disclaimer, the term of this patent is extended or adjusted under 35 U.S.C. 154(b) by 89 days.

(21) Appl. No.: 18/145,571

(22) Filed: Dec. 22, 2022

(65) Prior Publication Data

US 2023/0250812 A1 Aug. 10, 2023

(30) Foreign Application Priority Data

Feb. 9, 2022 (JP) ................................ 2022-018826

(51) Int. Cl.
*F04B 25/02* (2006.01)
*F04B 25/00* (2006.01)

(52) U.S. Cl.
CPC ............ *F04B 25/02* (2013.01); *F04B 25/005* (2013.01); *F05D 2210/12* (2013.01); *F05D 2270/02* (2013.01)

(58) Field of Classification Search
CPC ........ F04B 25/02; F04B 25/005; F04B 49/22; F04B 49/24; F04B 49/03; F04B 49/035; F05D 2210/12; F05D 2270/02
USPC .......................................................... 417/321
See application file for complete search history.

(56) References Cited

U.S. PATENT DOCUMENTS 1,467,489 A * 9/1923 Bruno ..................... F04B 25/02 417/268
5,863,186 A * 1/1999 Green ..................... F04B 9/113 417/244
6,390,779 B1 * 5/2002 Cunkelman ............. F04B 25/00 417/63
11,994,124 B1 * 5/2024 Guy ...................... F04B 49/007
2005/0053483 A1 * 3/2005 Iimura .................... F04B 41/02 417/321
2006/0045751 A1 * 3/2006 Beckman ................ F04B 41/02 417/44.2
2009/0311114 A1 * 12/2009 Schulz .................... F04B 25/02 417/254
2013/0280095 A1 * 10/2013 Worden .................. F04B 41/02 417/1
2014/0219830 A1 * 8/2014 Strickland ............. F04B 9/1095 417/212

(Continued)

FOREIGN PATENT DOCUMENTS

JP S62-040290 U 3/1987
JP H04-066796 A 3/1992
JP 2020-180600 A 11/2020

*Primary Examiner* — Mark A Laurenzi
*Assistant Examiner* — Benjamin Doyle
(74) *Attorney, Agent, or Firm* — Studebaker Brackett PLLC

(57) ABSTRACT

Provided is a reciprocating compressor including a third-stage compression unit, a fifth-stage compression unit, a drive unit, a discharge mechanism, a pressure sensor, and a discharge control unit. The discharge mechanism is capable of discharging hydrogen gas from a second connection pipe that allows hydrogen gas to flow to be suctioned into the third-stage compression unit. The discharge control unit controls the discharge mechanism to discharge the hydrogen gas from the second connection pipe when pressure of the hydrogen gas detected by the pressure sensor is higher than a set value preset.

6 Claims, 9 Drawing Sheets

(56) References Cited

U.S. PATENT DOCUMENTS

| | | | | |
|---|---|---|---|---|
| 2016/0169216 | A1* | 6/2016 | Okuno | F04B 39/14 92/73 |
| 2018/0180039 | A1* | 6/2018 | Adler | F04B 25/00 |
| 2019/0331103 | A1 | 10/2019 | Matsumoto et al. | |
| 2022/0314938 | A1* | 10/2022 | Wada | F04B 35/04 |

* cited by examiner

RECIPROCATING COMPRESSOR

FIELD OF THE INVENTION

The present invention relates to a reciprocating compressor.

BACKGROUND ART

As disclosed in JP 2018-17145 A, a reciprocating compressor that compresses hydrogen gas and includes compression units at multiple stages has been conventionally known. The compressor disclosed in JP 2018-17145 A includes compression units at five stages, and each of the compression units includes a piston to which a piston ring is attached and a cylinder that houses the piston. The compression units at first to third stages are connected to each other to foam a so-called tandem type, and the compression units at fourth and fifth stages are also connected to each other to form a tandem type. The pistons of the compression units at the first to fifth stages are driven by a common drive source.

This configuration may cause the compression unit at the first stage to increase in discharge pressure (suction pressure of the second compression unit) when gas leaks from the compression chamber at the second stage due to wear of the piston ring in the compression unit at the second stage, for example. This is because the gas leaked from a compression chamber in the compression unit at the second stage flows into a compression chamber of the compression unit at the first stage.

When a leakage of hydrogen gas from the compression chamber increases, a discharge rate from the compression chamber becomes insufficient, and when suction pressure of the compression unit at a leakage destination (or discharge pressure at a stage immediately before the leakage destination) increases, operation becomes difficult. This case may cause difficulty in continuing the operation, such as that the drive source needs to be stopped.

SUMMARY OF THE INVENTION

It is an object of the present invention to prevent excessive increase in suction pressure of a compression unit on a low-pressure side (discharge pressure of a compression unit at a stage immediately before the compression unit on the low-pressure side) even when hydrogen gas leaks from the compression unit to the compression unit on the low-pressure side.

A reciprocating compressor according to an aspect of the present invention for compressing hydrogen gas, includes: a low-pressure stage compression unit that includes a low-pressure stage piston, a low-pressure stage cylinder that houses the low-pressure stage piston, and a piston ring group attached to the low-pressure stage piston to compress the hydrogen gas; a high-pressure stage compression unit that includes a high-pressure stage piston connected to the low-pressure stage piston, a high-pressure stage cylinder that houses the high-pressure stage piston and is connected to the low-pressure stage cylinder, and a piston ring group attached to the high-pressure stage piston to compress the hydrogen gas after being compressed by the low-pressure stage compression unit; a drive unit for driving the high-pressure stage compression unit and the low-pressure stage compression unit; a discharge mechanism that allows the hydrogen gas to be discharged from a suction-side flow path that allows hydrogen gas to flow to be suctioned into the low-pressure stage compression unit; a pressure sensor for detecting a pressure of the hydrogen gas suctioned into the low-pressure stage compression unit or a pressure of the hydrogen gas discharged from the low-pressure stage compression unit; and a discharge control unit for controlling the discharge mechanism to discharge the hydrogen gas from the suction-side flow path when the pressure of the hydrogen gas detected by the pressure sensor is higher than a set value preset.

A reciprocating compressor according to another aspect of the present invention for compressing hydrogen gas, includes: a low-pressure stage compression unit that includes a low-pressure stage piston, a low-pressure stage cylinder that houses the low-pressure stage piston, and a piston ring group attached to the low-pressure stage piston to compress the hydrogen gas; an intermediate-stage compression unit for compressing the hydrogen gas discharged from the low-pressure stage compression unit; a high-pressure stage compression unit that includes a high-pressure stage piston connected to the low-pressure stage piston, a high-pressure stage cylinder that houses the high-pressure stage piston and is connected to the low-pressure stage cylinder, and a piston ring group attached to the high-pressure stage piston to compress the hydrogen gas discharged from the intermediate-stage compression unit; a drive unit for driving the low-pressure stage compression unit, the intermediate-stage compression unit, and the high-pressure stage compression unit; a discharge mechanism that allows the hydrogen gas to be discharged from a suction-side flow path that allows the hydrogen gas to flow to be suctioned into the low-pressure stage compression unit; a pressure sensor for detecting a pressure of the hydrogen gas suctioned into the low-pressure stage compression unit, a pressure of the hydrogen gas discharged from the low-pressure stage compression unit and suctioned into the intermediate-stage compression unit, or a pressure of the hydrogen gas discharged from the intermediate-stage compression unit and suctioned into the high-pressure stage compression unit; and a discharge control unit for controlling the discharge mechanism to discharge the hydrogen gas from the suction-side flow path when the pressure of the hydrogen gas detected by the pressure sensor is higher than a set value preset.

DESCRIPTION OF EMBODIMENTS

Hereinafter, embodiments will be described in detail with reference to the drawings.

First Embodiment

Figure 1:
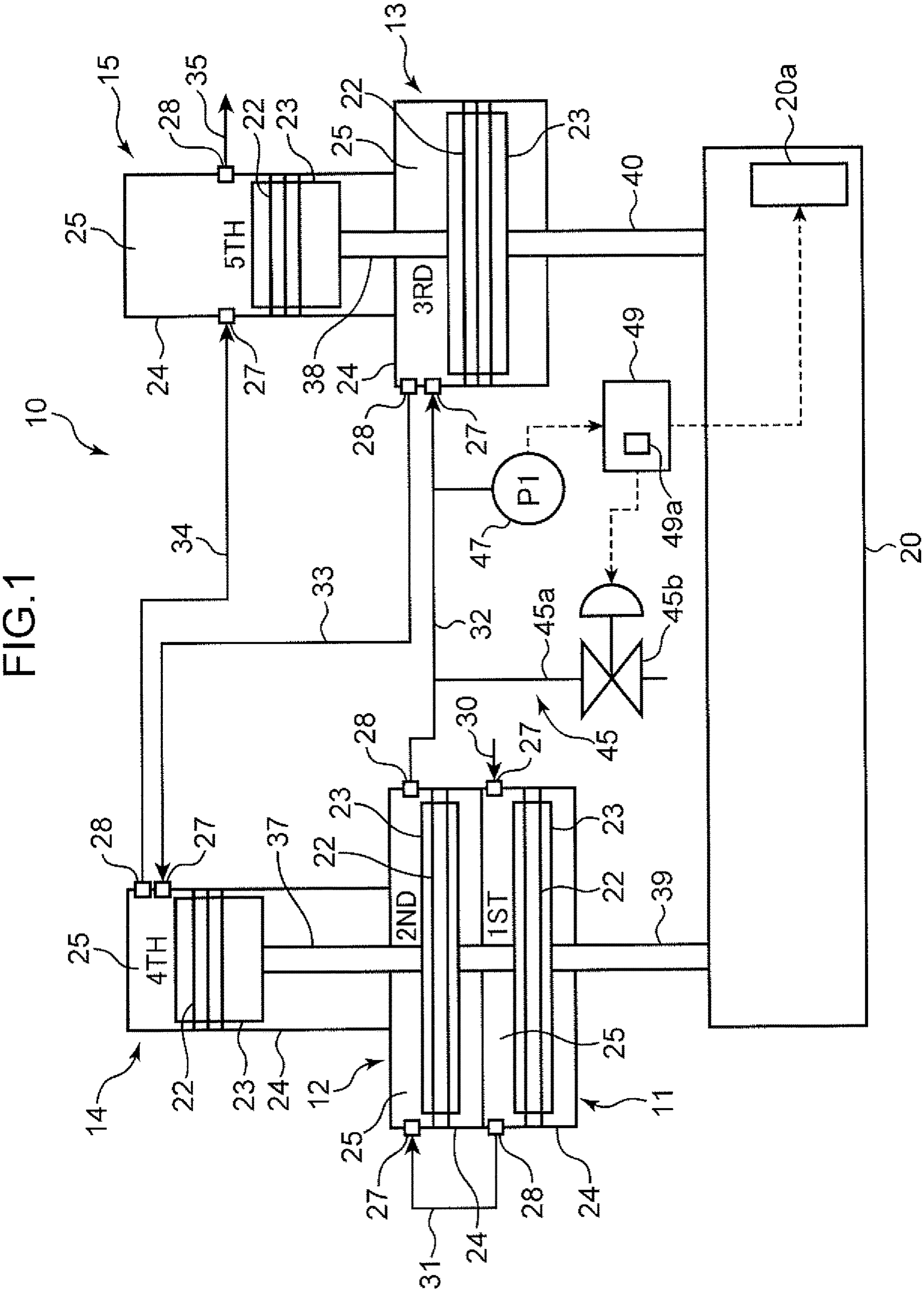
FIG. 1 is a diagram schematically illustrating a configuration of a reciprocating compressor according to a first embodiment.

As illustrated in FIG. 1, a reciprocating compressor 10 according to a first embodiment is for compressing hydrogen gas, and is configured as a multistage compressor including compression units 11 to 15 at multiple stages (five stages in an example of the drawing). The reciprocating compressor 10 may be provided in a hydrogen station for filling a tank of a fuel cell vehicle or the like using high-pressure hydrogen gas, for example.

The reciprocating compressor 10 includes a first-stage compression unit 11, a second-stage compression unit 12, a third-stage compression unit 13, a fourth-stage compression unit 14, a fifth-stage compression unit 15, and a drive unit 20 that drives these compression units 11 to 15. The hydrogen gas compressed in the first-stage compression unit 11 is introduced into the second-stage compression unit 12 and further compressed. The hydrogen gas is further sequentially compressed by the third-stage to fifth-stage compression units 13 to 15. Each of the compression units 11 to 15 includes a piston 23 to which a piston ring group 22 is attached, and a cylinder 24 that houses the piston 23, and is constituted of a reciprocating compression mechanism including a space close to a distal end of the piston 23 in the cylinder 24, the space functioning as a compression chamber 25.

The cylinder 24 of each of the compression units 11 to 15 is provided with a suction valve 27 and a discharge valve 28 at respective positions facing the corresponding compression chamber 25. The first-stage compression unit 11 includes the suction valve 27 connected to a suction pipe 30, and the discharge valve 28 connected to one end of a first connection pipe 31. Thus, hydrogen gas is suctioned into the compression chamber 25 of the first-stage compression unit 11 through the suction pipe 30. The first connection pipe 31 is connected at the other end to the suction valve 27 of the second-stage compression unit 12. Thus, the hydrogen gas compressed by the first-stage compression unit 11 is suctioned into the compression chamber 25 of the second-stage compression unit 12 through the first connection pipe 31. The second-stage compression unit 12 includes the discharge valve 28 connected to one end of a second connection pipe 32, and the second connection pipe 32 is connected at the other end to the suction valve 27 of the third-stage compression unit 13. Thus, the hydrogen gas compressed by the second-stage compression unit 12 is suctioned into the compression chamber 25 of the third-stage compression unit 13 through the second connection pipe 32. The third-stage compression unit 13 includes the discharge valve 28 connected to one end of a third connection pipe 33, and the third connection pipe 33 is connected at the other end to the suction valve 27 of the fourth-stage compression unit 14. Thus, the hydrogen gas compressed by the third-stage compression unit 13 is suctioned into the compression chamber 25 of the fourth-stage compression unit 14 through the third connection pipe 33. The fourth-stage compression unit 14 includes the discharge valve 28 connected to one end of a fourth connection pipe 34, and the fourth connection pipe 34 is connected at the other end to the suction valve 27 of the fifth-stage compression unit 15. Thus, the hydrogen gas compressed by the fourth-stage compression unit 14 is suctioned into the compression chamber 25 of the fifth-stage compression unit 15 through the fourth connection pipe 34. The fifth-stage compression unit 15 includes the discharge valve 28 connected to a supply pipe 35. Thus, the hydrogen gas compressed by the fifth-stage compression unit 15 is discharged through the supply pipe 35.

The first-stage compression unit 11, the second-stage compression unit 12, and the fourth-stage compression unit 14 are connected to each other to form a so-called tandem compression mechanism. That is, the pistons 23 of the respective compression units 11, 12, and 14 are connected to each other by a connecting rod 37. The cylinders 24 of the respective compression units 11, 12, and 14 are connected to each other and integrated. Thus, when the hydrogen gas may leak from the compression chamber 25 of the fourth-stage compression unit 14, the leaked gas may flow into the compression chamber 25 of the second-stage compression unit 12.

The third-stage compression unit 13 and the fifth-stage compression unit 15 are connected to each other to form a so-called tandem compression mechanism. That is, the pistons 23 of the respective compression units 13 and 15 are connected to each other by a connecting rod 38. The cylinders 24 of the respective compression units 13 and 15 are connected to each other and integrated. Thus, when the hydrogen gas may leak from the compression chamber 25 of the fifth-stage compression unit 15, the leaked gas may flow into the compression chamber 25 of the third-stage compression unit 13.

The piston 23 of the first-stage compression unit 11 is connected to a first crank mechanism (not illustrated) of the drive unit 20 by a drive rod 39, and the piston 23 of the third-stage compression unit 13 is connected to a second crank mechanism (not illustrated) of the drive unit 20 by another drive rod 40. The first crank mechanism and the second crank mechanism are driven by a motor 20*a* provided in the drive unit 20. Thus, the drive unit 20 collectively drives the pistons 23 of the respective first-stage to fifth-stage compression units 11 to 15. At this time, the pistons 23 move in the same cycle.

The second connection pipe 32 through which the hydrogen gas suctioned into the third-stage compression unit 13 flows is provided with a discharge mechanism 45 capable of discharging the hydrogen gas from the inside of the second connection pipe 32. The discharge mechanism 45 includes a gas discharge path 45*a* connected to the second connection pipe 32 and a discharge valve 45*b* located on the gas discharge path 45*a*. The discharge valve 45*b* includes an on-off valve that switches opening and closing of the gas discharge path 45*a*.

The discharge valve 45*b* may be directly attached to the second connection pipe 32 while branching from the second connection pipe 32. This case allows the gas discharge path 45*a* to be eliminated. The discharge mechanism 45 may be constituted of a three-way valve provided on the second connection pipe 32. This case allows the three-way valve to be configured to be switchable between a state in which hydrogen gas can be discharged from the second connection pipe 32 and a state in which hydrogen gas is not discharged from the second connection pipe 32.

The second connection pipe 32 is provided with a pressure sensor 47 for detecting pressure of hydrogen gas flowing through the second connection pipe 32. That is, when the third-stage compression unit 13 is regarded as a low-pressure stage compression unit, the fifth-stage compression unit 15 serves as a high-pressure stage compression unit, and the fourth-stage compression unit 14 serves as an intermediate-pressure stage compression unit. At this time, the piston 23 and the cylinder 24 of the third-stage compression unit 13 function as a low-pressure stage piston and a low-pressure stage cylinder, respectively, the piston 23 and the cylinder 24 of the fourth-stage compression unit 14 function as an intermediate-pressure stage piston and an intermediate-pressure stage cylinder, respectively, and the piston 23 and the cylinder of the fifth-stage compression unit 15 function as a high-pressure stage piston and a high-pressure stage cylinder, respectively. The second connection pipe 32 functions as a suction-side flow path through which the hydrogen gas suctioned into the low-pressure stage compression unit flows. The pressure sensor 47 detects pressure of the hydrogen gas suctioned into the low-pressure stage compression unit.

The pressure sensor 47 outputs a signal indicating the detected pressure. This signal is received by a controller 49. The controller 49 is constituted of a microcomputer including a CPU that performs arithmetic processing, a ROM that stores a processing program, data, and the like, and a RAM that temporarily stores data. The controller 49 exerts a predetermined function by executing the processing program. This function includes a function of a discharge control unit 49*a*.

The discharge control unit 49*a* is configured to control the discharge valve 45*b* to discharge the hydrogen gas from the second connection pipe 32 when pressure of the hydrogen gas detected by the pressure sensor 47 is higher than a set value preset. This set value is higher than a pressure value in the second connection pipe 32 when the suction valve 27 of the third-stage compression unit 13 is opened in a normal state.

That is, when differential pressure between pressure in the second connection pipe 32 and pressure in the compression chamber 25 of the third-stage compression unit 13 reaches a set pressure value, the suction valve 27 is opened. Thus, increase in pressure in the second connection pipe 32 to more than a normal pressure value causes pressure in the compression chamber 25 of the third-stage compression unit 13 to be higher than a normal pressure value. Assumed examples of this case include a case where leaked gas from the fifth-stage compression unit 15 flows into the compression chamber 25 of the third-stage compression unit 13 due to wear or the like of the piston ring group 22 of the fifth-stage compression unit 15, so that the pressure in the compression chamber 25 of the third-stage compression unit 13 increases to more than the normal pressure value. Thus, when the pressure sensor 47 detects that the pressure in the second connection pipe 32 is higher than the set value, the discharge mechanism 45 discharges the hydrogen gas in the second connection pipe 32 to prevent suction pressure of the third-stage compression unit 13 from excessively increasing.

Here, operation of the reciprocating compressor 10 will be described. The reciprocating compressor 10 according to the first embodiment causes the drive unit 20 to be driven when the controller 49 receives a command from the outside. When the drive unit 20 is driven, the discharge valve 45*b* of the discharge mechanism 45 is normally closed. The drive unit 20 is driven to compress the hydrogen gas in each of the compression units 11 to 15. The hydrogen gas is suctioned into the first-stage compression unit 11 through the suction pipe 30 and compressed, and then sequentially compressed in the second-stage compression unit 12 to the fifth-stage compression unit 15, and discharged through the supply pipe 35.

At this time, the pressure sensor 47 detects the pressure of the hydrogen gas in the second connection pipe 32. The detection value of the pressure sensor 47 is normally to be lower than the set value. Thus, the discharge valve 45*b* is closed. However, when leaked gas from the fifth-stage compression unit 15 flows into the compression chamber 25 of the third-stage compression unit 13 to increase pressure in the second connection pipe 32 to higher than the set value, the detection value of the pressure sensor 47 becomes higher than the set value. The controller 49 accordingly opens the discharge valve 45*b*. As a result, the hydrogen gas is discharged from the second connection pipe 32 to reduce the amount of hydrogen gas suctioned into the third-stage compression unit 13, and thus preventing excessive increase in suction pressure of the third-stage compression unit 13.

As described above, the present embodiment may cause the hydrogen gas suctioned into the third-stage compression unit 13 or the hydrogen gas discharged from the third-stage compression unit 13 to have pressure higher than the set value when the hydrogen gas leaks from the fifth-stage compression unit 15 to the third-stage compression unit 13. In this case, the discharge mechanism 45 discharges the hydrogen gas from the second connection pipe 32. This configuration enables preventing an excessive increase in suction pressure of the third-stage compression unit 13 or discharge pressure of the third-stage compression unit 13 even when hydrogen gas leaks from the fifth-stage compression unit 15 to the third-stage compression unit 13. Thus, difficulty in operating the compressor 10 can be suppressed.

Figure 2:
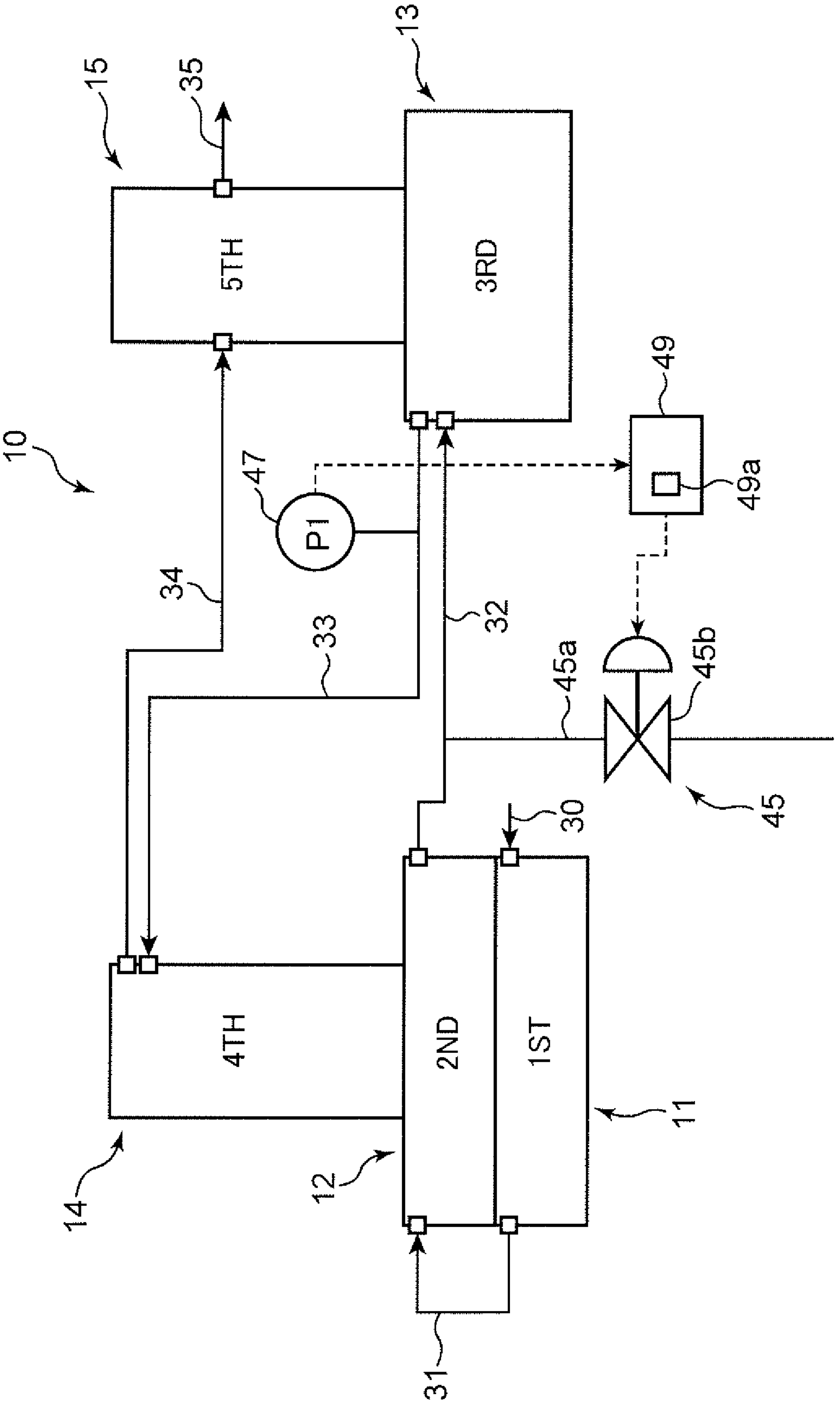
FIG. 2 is a diagram schematically illustrating a configuration of a reciprocating compressor according to a modification of the first embodiment.

The first embodiment allows the pressure sensor 47 to be provided in the second connection pipe 32. Alternatively, the pressure sensor 47 may be provided in the third connection pipe 33 as illustrated in FIG. 2. That is, the pressure sensor 47 may be configured to detect pressure of hydrogen gas discharged from a low-pressure stage compression unit or hydrogen gas suctioned into an intermediate-stage compression unit. In other words, gas discharge may be controlled by detecting pressure of hydrogen gas suctioned into a compression unit at a subsequent stage (compression unit at a next stage) of a compression unit into which the leaked gas flows.

When the leaked gas from the fifth-stage compression unit 15 flows into the compression chamber 25 of the third-stage compression unit 13 due to wear or the like of the piston ring group 22 of the fifth-stage compression unit 15, gas pressure increases in the third connection pipe 33 through which the discharged gas from the third-stage compression unit 13 flows. Thus, even when the pressure sensor 47 is provided in the third connection pipe 33, the pressure sensor 47 can detect gas leakage from the fifth-stage compression unit 15 to the third-stage compression unit 13.

The first embodiment enables addressing gas leakage from the fifth-stage compression unit 15 to the third-stage compression unit 13 by providing the pressure sensor 47 in the second connection pipe 32. Alternatively or additionally, the pressure sensor 47 may be provided in the first connection pipe 31, and the discharge mechanism 45 may discharge hydrogen gas from the first connection pipe 31 to enable addressing gas leakage from the fourth-stage compression unit 14 (high-pressure stage compression unit) to the second-stage compression unit 12 (low-pressure stage compression unit).

Second Embodiment

Figure 3:
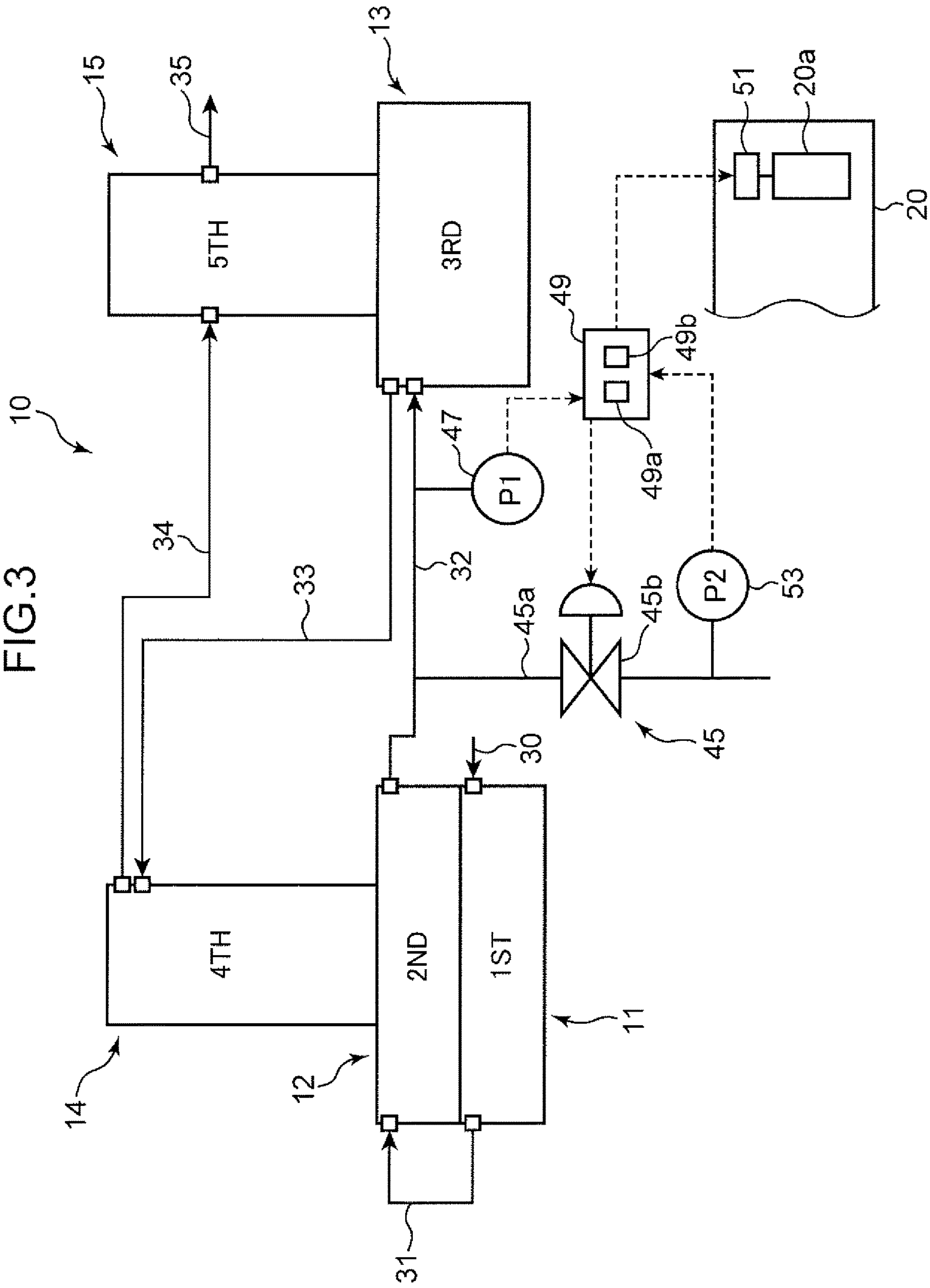
FIG. 3 is a diagram schematically illustrating a configuration of a reciprocating compressor according to a second embodiment.

FIG. 3 illustrates a second embodiment. Here, the same components as those of the first embodiment are denoted by the same reference numerals, and a detailed description thereof will not be described.

The second embodiment allows a motor 20*a* to increase in rotational speed when a discharge mechanism 45 discharges hydrogen gas, thereby compensating for the amount of gas corresponding to the discharge. Hereinafter, the second embodiment will be specifically described.

A reciprocating compressor 10 is provided with an inverter 51 capable of adjusting the rotational speed of the motor 20*a* of a drive unit 20, and the inverter 51 adjusts the rotational speed of the motor 20*a*.

A discharge valve 45*b* is constituted of a valve capable of adjusting a valve opening. Thus, when an opening of the discharge valve 45*b* is adjusted, a gas discharge rate with the discharge mechanism 45 is changed. The opening of the discharge valve 45*b* is adjusted by a discharge control unit 49*a* in accordance with a magnitude of differential pressure dP between pressure on a primary side and pressure on a secondary side of the discharge valve 45*b* (differential pressure between a detection value P1 of a pressure sensor 47 and a detection value P2 of an auxiliary pressure sensor 53 described later).

The auxiliary pressure sensor 53 is provided in a gas discharge path 45*a* while being located downstream of the discharge valve 45*b* and detects gas pressure downstream of the discharge valve 45*b*.

Figure 4:
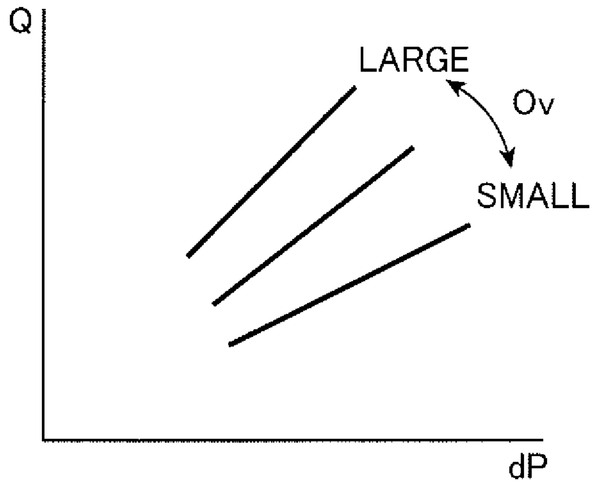
FIG. 4 is a diagram schematically illustrating flow rate characteristics data on a discharge valve stored in a controller.

The controller 49 stores flow rate characteristics data on the discharge valve 45*b*. This flow rate characteristics data defines a relationship among the differential pressure dP between pressure on the primary side and pressure on the secondary side of the discharge valve 45*b* (differential pressure between the detection value P1 of the pressure sensor 47 and the detection value P2 of the auxiliary pressure sensor 53), a valve opening Ov of the discharge valve 45*b*, and a discharge flow rate Q. Although the flow rate characteristics of the discharge valve 45*b* indicates that the discharge flow rate Q increases as the differential pressure dP between the detection values P1 and P2 increases as illustrated in FIG. 4, for example, a degree of increase in the discharge flow rate Q increases as the valve opening Ov of the discharge valve 45*b* increases.

The controller 49 also stores rotational characteristics data that indicates a relationship between rotational speed of the motor 20*a* and a discharge flow rate of hydrogen gas from the second-stage compression unit 12. Thus, when throughput of gas is increased, the controller 49 can derive an increase in the motor rotational speed in accordance with the increase of the throughput. The controller 49 may store rotational characteristic data that indicates a relationship between rotational speed of the motor 20*a* and a discharge flow rate of hydrogen gas from at least one of the first-stage to fifth-stage compression units 11 to 15.

The controller 49 includes a function of a rotational speed control unit 49*b* that controls the inverter 51. When the discharge valve 45*b* of the discharge mechanism 45 is opened to a predetermined opening in response to a command of the discharge control unit 49*a*, hydrogen gas is discharged from the second connection pipe 32. Thus, the rotational speed control unit 49*b* performs control to increase the rotational speed of the motor 20*a* to add the amount of gas compression corresponding to a discharge rate of the hydrogen gas to the amount of normal compression. More specifically, the rotational speed control unit 49*b* derives the discharge flow rate Q using the detection value P1 of the pressure sensor 47, the detection value P2 of the auxiliary pressure sensor 53, and the flow rate characteristics of the discharge valve 45*b* stored in the controller 49. Specifically, the differential pressure dP is calculated from the detection values P1 and P2, and the discharge flow rate Q is derived based on the calculated differential pressure dP and the current valve opening Ov stored in the controller 49. The current valve opening Ov stored in the controller 49 is based on the data sent from the discharge valve 45*b*. Then, the rotational speed control unit 49*b* derives how much the rotational speed needs to be increased using the rotation characteristics data, and controls the inverter 51 to increase the rotational speed of the motor 20*a* by the derived rotational speed. The rotational speed control unit 49*b* may increase the rotational speed in compensation for the amount of hydrogen gas (or a gas flow rate thereof) smaller than a discharge rate thereof (or a flow rate thereof), instead of compensating for the amount of hydrogen gas (or a flow rate thereof) equal to the discharge rate thereof (or the flow rate thereof). In this case, a half or more of the amount of hydrogen gas (or a flow rate thereof) discharged may be compensated, for example.

Thus, the present embodiment allows the motor 20*a* to increase its rotational speed when the hydrogen gas is discharged, thereby increasing a discharge rate of the hydrogen gas by the third-stage compression unit 13 to the fifth-stage compression unit 15. This configuration enables compensating for the hydrogen gas discharged by the discharge mechanism 45, and thus enables suppressing a decrease in throughput of hydrogen gas with the reciprocating compressor 10. Although the discharge rate of the hydrogen gas with the third-stage compression unit 13 increases by increasing the rotational speed of the motor 20*a* because a leakage from the fifth-stage compression unit 15 is constant, an increase in discharge pressure of the third-stage compression unit 13 can be suppressed.

The present embodiment allows the detection value P1 of the pressure sensor 47 to be used when the amount of compensation of hydrogen gas is derived. Thus, a discharge rate of hydrogen gas with the discharge mechanism 45 can be derived while the pressure sensor 47 for detecting gas pressure in the second connection pipe 32 (a suction-side flow path of the third-stage compression unit 13) is used.

Figure 5:
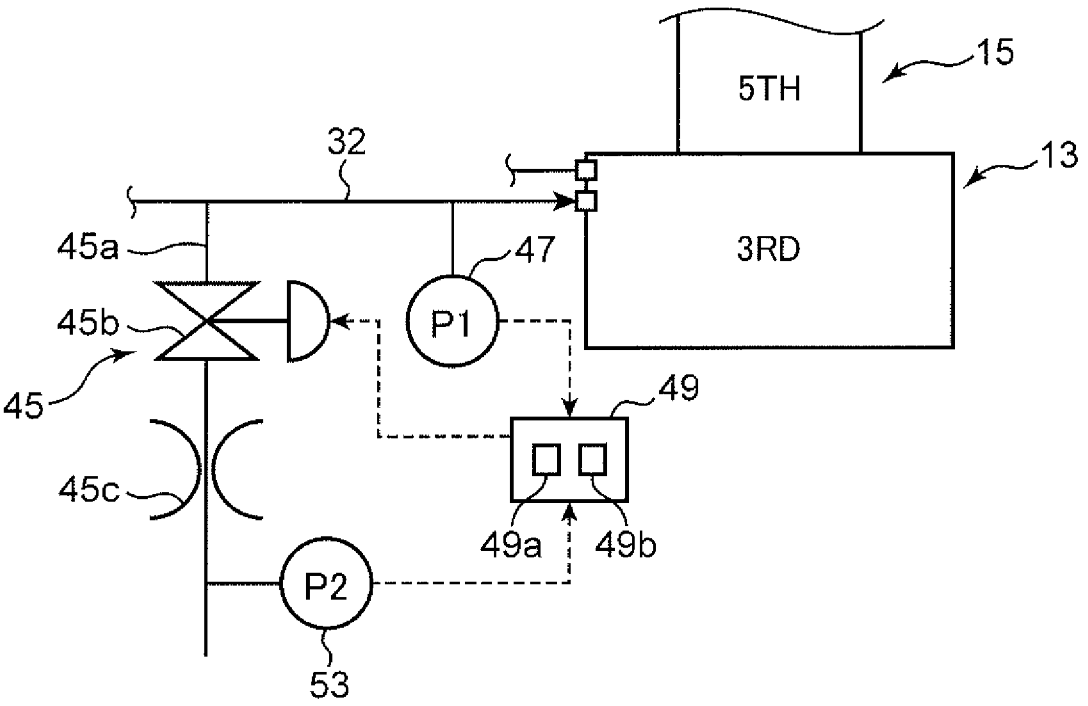
FIG. 5 is a diagram partially and schematically illustrating a reciprocating compressor according to a modification of the second embodiment.
Figure 6:
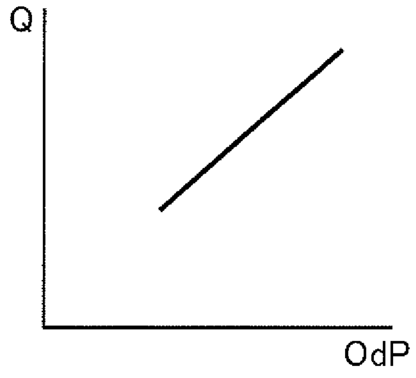
FIG. 6 is a diagram schematically illustrating flow rate characteristics data on an orifice stored in a controller.

Although the second embodiment allows the discharge valve 45*b* to be constituted of a valve capable of adjusting its opening, the present embodiment is not limited thereto. For example, the discharge mechanism 45 may include the discharge valve 45*b* formed of an on-off valve and located in the gas discharge path 45*a*, and an orifice 45*c* located downstream of the discharge valve 45*b* in the gas discharge path 45*a*, as illustrated in FIG. 5. This case allows the controller 49 to store flow rate characteristics data on the orifice 45*c*. As illustrated in FIG. 6, the flow rate characteristics data defines a relationship between differential pressure (differential pressure between the primary side and the secondary side) OdP in the orifice 45*c* and the discharge flow rate Q. The flow rate characteristics data shows flow rate characteristics of the orifice 45*c*, in which the discharge flow rate Q increases as the differential pressure OdP at the orifice 45*c* increases.

The rotational speed control unit 49*b* derives the discharge flow rate Q using the detection value P1 of the pressure sensor 47, the detection value P2 of the auxiliary pressure sensor 53, and the flow rate characteristics of the orifice 45*c* stored in the controller 49. Then, the rotational speed control unit 49*b* derives how much the rotational speed needs to be increased using the rotation characteristics data, and controls the inverter 51 to increase the rotational speed of the motor 20*a* by the derived rotational speed.

Although other configurations, operations, and effects are not described, the description of the first embodiment can be applied to the second embodiment.

Third Embodiment

Figure 7:
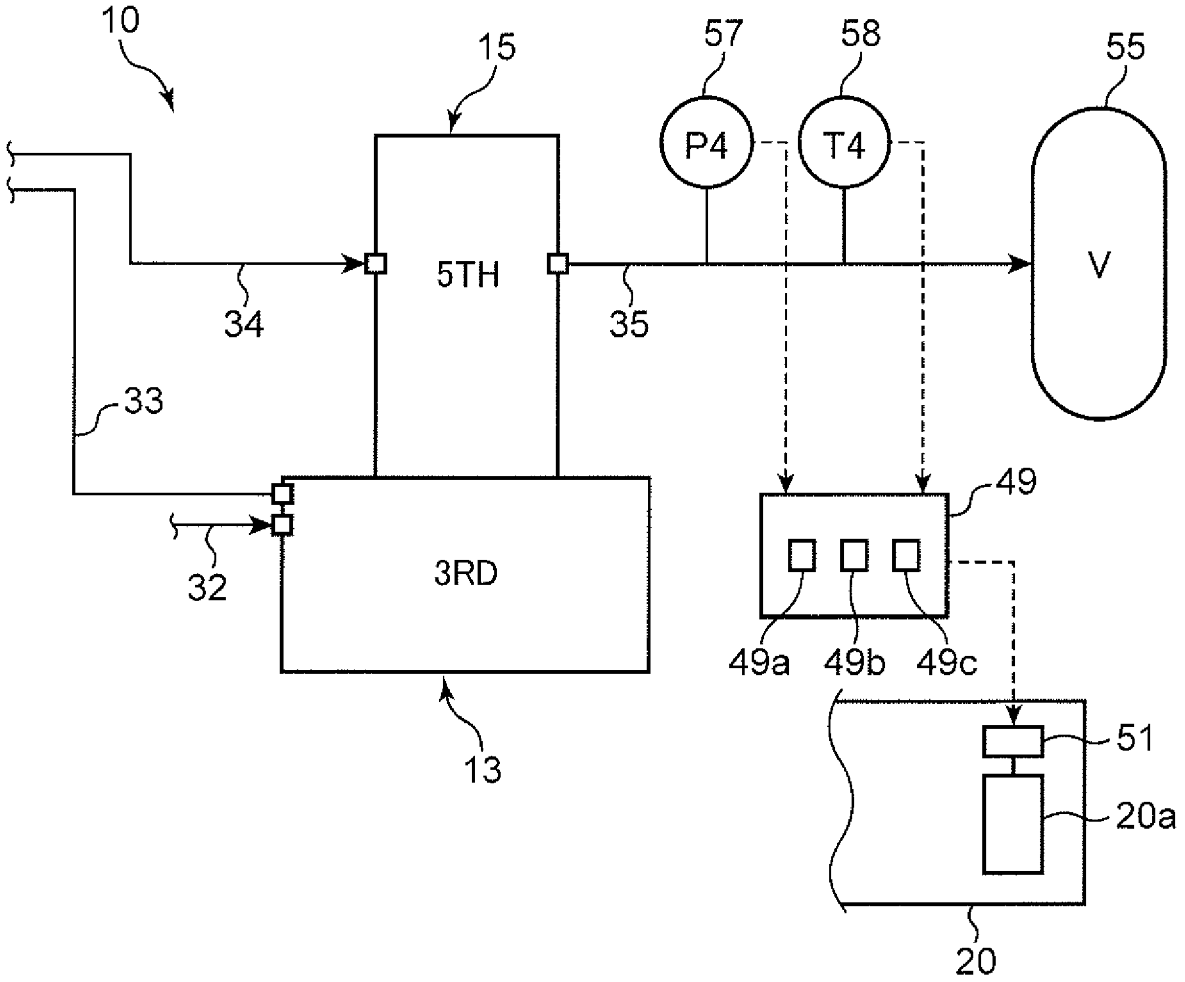
FIG. 7 is a diagram partially and schematically illustrating a reciprocating compressor according to a third embodiment.

FIG. 7 illustrates a third embodiment. Here, the same components as those of the first and second embodiments are denoted by the same reference numerals, and a detailed description thereof will not be described.

A reciprocating compressor 10 according to the third embodiment allows an accumulator 55 including a tank to serve as a demander of hydrogen gas discharged from the compressor 10. The reciprocating compressor 10 in this case is configured to adjust a discharge rate of hydrogen gas to allow the accumulator 55 to store a predetermined amount of hydrogen gas within a predetermined time.

As illustrated in FIG. 7, a supply pipe 35 is connected to the accumulator 55. The supply pipe 35 is provided with a demand side pressure sensor 57 for detecting pressure of hydrogen gas in the supply pipe 35 (pressure of the hydrogen gas after being discharged from the compressor 10) and a demand side temperature sensor 58 for detecting temperature of the hydrogen gas in the supply pipe 35 (temperature of the hydrogen gas after being discharged from the compressor 10). The supply pipe 35 is a demander connection flow path that connects the reciprocating compressor 10 and the accumulator 55 to each other. The demand side pressure sensor 57 may be located in the accumulator 55. The demand side temperature sensor 58 also may be located in the accumulator 55.

The present embodiment requires the predetermined amount of hydrogen gas to be stored in the accumulator 55 within the predetermined time, so that the controller 49 includes a function of an estimation unit 49*c* that estimates a density variation of hydrogen gas per unit time in the accumulator 55. That is, the estimation unit 49*c* derives the density of the hydrogen gas stored in the accumulator 55 with a gas state equation to which detection values are applied, the detection values including pressure detected by the demand side pressure sensor 57 as pressure of the hydrogen gas, temperature detected by the demand side temperature sensor 58 as temperature of the hydrogen gas, and a tank capacity of the accumulator 55 as a volume of the hydrogen gas. Then, the estimation unit 49*c* derives repetition density from the detection values repeatedly detected by the demand side pressure sensor 57 and the demand side temperature sensor 58, and estimates the density variation per unit time of the hydrogen gas accumulated in the accumulator 55.

The accumulator 55 is required to store hydrogen gas under predetermined pressure within the predetermined time, so that the amount of hydrogen gas discharged needs to be compensated when a part of the hydrogen gas is discharged by the discharge mechanism 45. Thus, a rotational speed control unit 49*b* is configured to increase rotational speed of the motor 20*a* in compensation for the amount (or a flow rate) of the hydrogen gas, corresponding to a difference between the density variation per unit time of the hydrogen gas accumulated in the accumulator 55 on an assumption that there is no leakage of hydrogen gas from a high-pressure stage compression unit to a low-pressure stage compression unit and the density variation per unit time of the hydrogen gas estimated by the estimation unit 49*c*.

Figure 8:
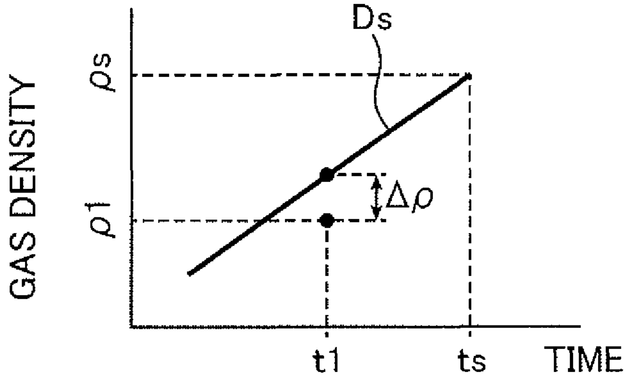
FIG. 8 is a diagram schematically illustrating a relationship between time and gas density stored in a controller.

For example, the controller 49 stores data Ds indicating a time transition of density $\rho$ (on an assumption that there is no leakage of hydrogen gas from the high-pressure stage compression unit to the low-pressure stage compression unit) so that hydrogen gas at a predetermined density $\rho s$ can be stored within a predetermined time is as illustrated in FIG. 8. Then, gas density $\rho$1 at a certain time t1 is derived from the density variation per unit time of the hydrogen gas estimated by the estimation unit 49*c*. Then, the controller 49 derives a difference $\Delta\rho$ between the data Ds at the time t1 and the derived gas density $\rho$1, and the rotational speed control unit 49*b* performs control of increasing the rotational speed of the motor 20*a* in compensation for the difference $\Delta\rho$. This configuration enables the accumulator 55 to store the hydrogen gas under the predetermined pressure within the predetermined time even when the hydrogen gas is discharged by the discharge mechanism 45.

Thus, the present embodiment enables preventing time for accumulating the hydrogen gas in the accumulator 55 from increasing to more than assumed time even when the hydrogen gas leaks from the high-pressure stage compression unit to the low-pressure stage compression unit.

Although other configurations, operations, and effects are not described, the description of the first and second embodiments can be applied to the third embodiment.

Fourth Embodiment

Figure 9:
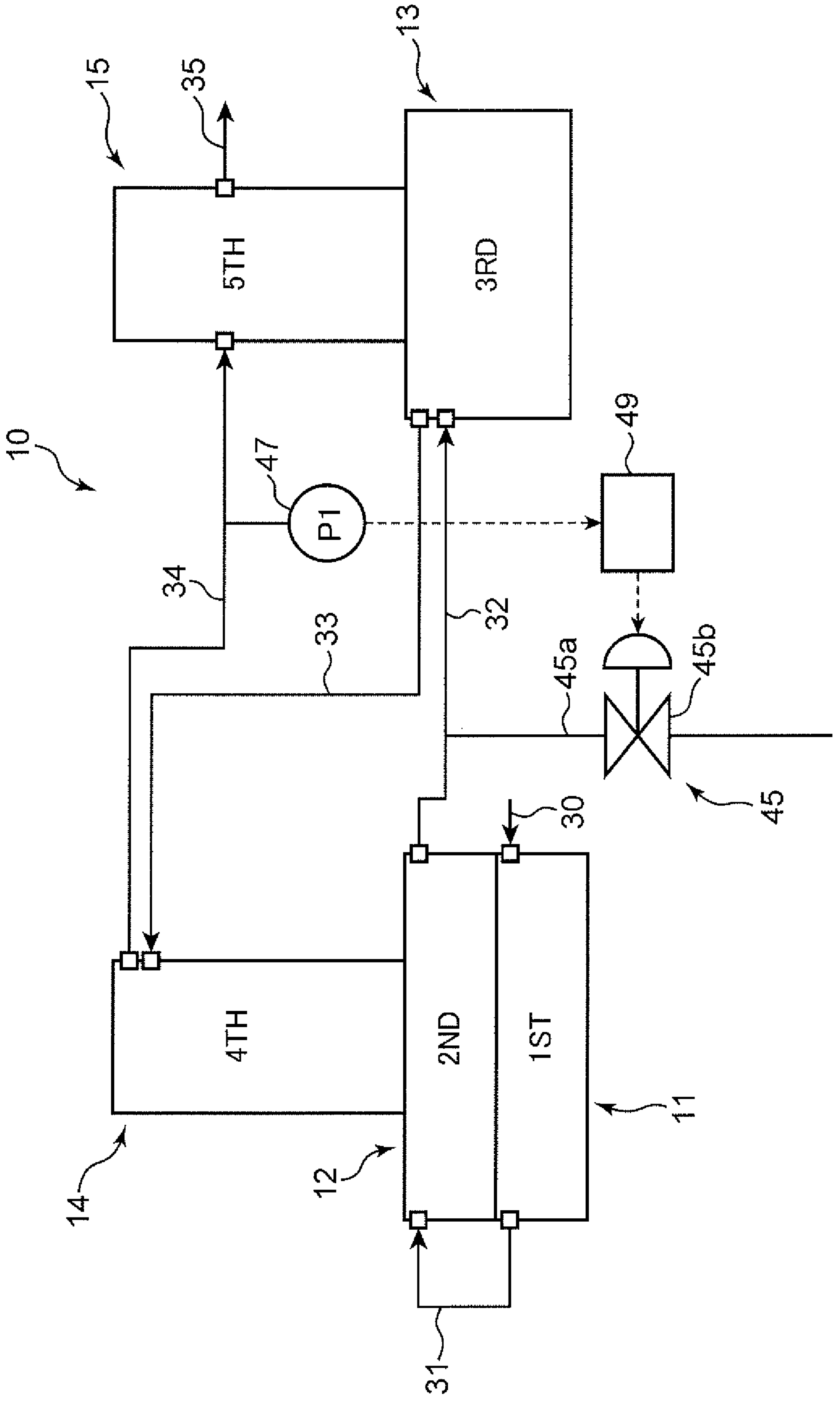
FIG. 9 is a diagram schematically illustrating a configuration of a reciprocating compressor according to a fourth embodiment.

FIG. 9 illustrates a fourth embodiment. Here, the same components as those of the first to third embodiments are denoted by the same reference numerals, and a detailed description thereof will not be described.

The fourth embodiment is different from the first embodiment in that a pressure sensor 47 is located in a fourth connection pipe 34. When a third-stage compression unit 13 is regarded as a low-pressure stage compression unit, a fifth-stage compression unit 15 serves as a high-pressure stage compression unit. Then, a fourth-stage compression unit 14 functions as an intermediate-stage compression unit that compresses hydrogen gas discharged from the low-pressure stage compression unit. Thus, the pressure sensor 47 is provided in the fourth connection pipe 34, and is configured to detect pressure of the hydrogen gas discharged from the intermediate-stage compression unit and suctioned into the high-pressure stage compression unit. That is, when the hydrogen gas leaks from the fifth-stage compression unit 15 to the third-stage compression unit 13, pressure of gas discharged from the third-stage compression unit 13 is also higher than an assumed value. In this case, pressure of the gas suctioned into the fourth-stage compression unit 14 and pressure of the gas discharged from the fourth-stage compression unit 14 are each also higher than an assumed value. Thus, even when the pressure sensor 47 is located in the fourth connection pipe 34, a gas leakage from the fifth-stage compression unit 15 to the third-stage compression unit 13 can be detected. When the pressure of the hydrogen gas detected by the pressure sensor 47 is higher than a preset set value, the discharge mechanism 45 discharges the hydrogen gas from a second connection pipe 32 (a pipe connected to a suction valve of the low-pressure stage compression unit).

Although other configurations, operations, and effects are not described, the description of the first to third embodiments can be applied to the fourth embodiment.

Other Embodiments

Figure 10:
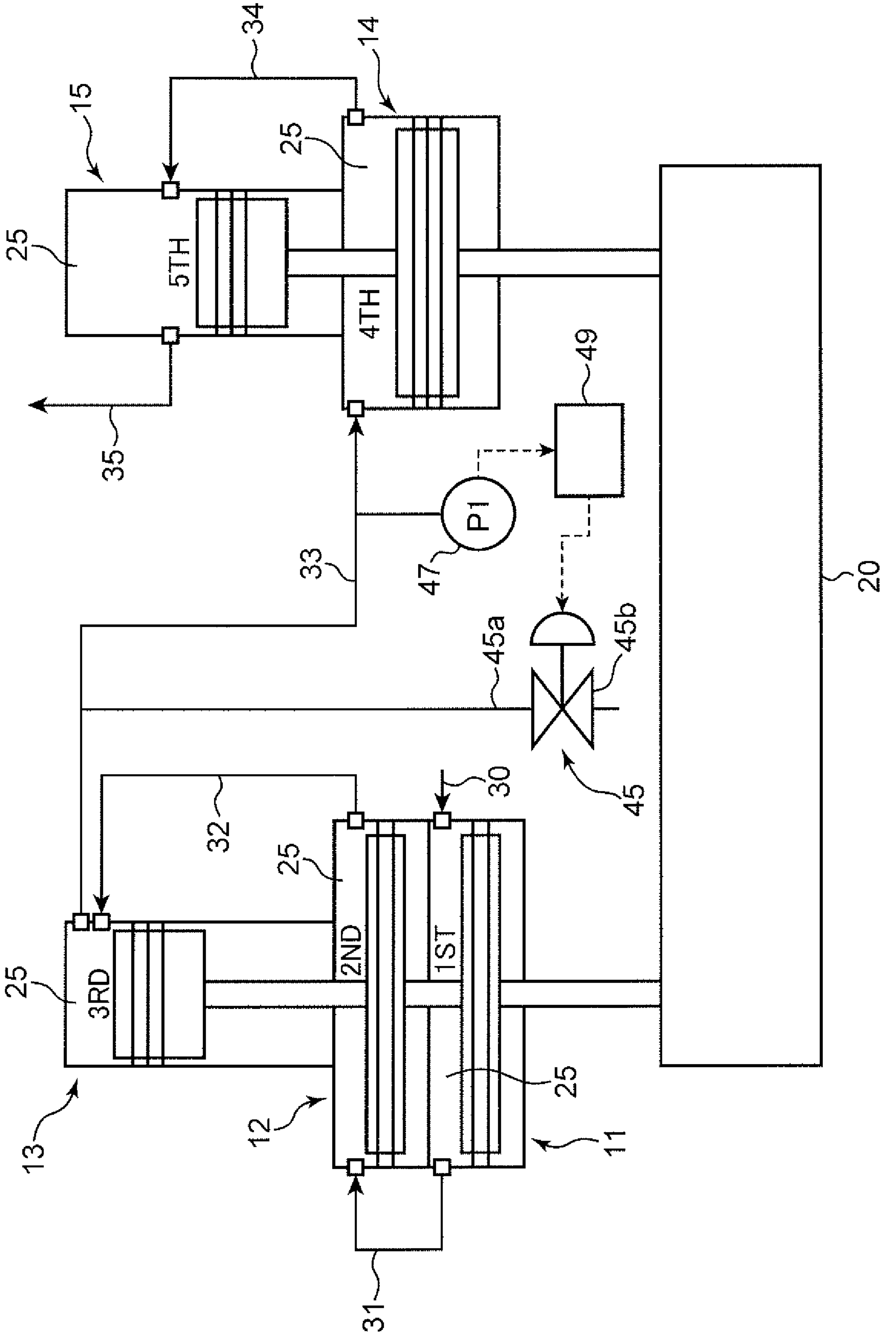
FIG. 10 is a diagram schematically illustrating a configuration of a reciprocating compressor according to another embodiment.

It should be understood that the embodiments disclosed herein are illustrative in all respects and are not restrictive. The present invention is not limited to the above embodiments, and various modifications, improvements, and the like can be made without departing from the gist of the present invention. For example, although the first-stage compression unit 11, the second-stage compression unit 12, and the fourth-stage compression unit 14 are of a tandem type, and the third-stage compression unit 13 and the fifth-stage compression unit 15 are of a tandem type, in the above embodiments, the present embodiment is not limited thereto. For example, the first-stage compression unit 11, the second-stage compression unit 12, and the third-stage compression unit 13 may be of a tandem type, and the fourth-stage compression unit 14 and the fifth-stage compression unit 15 may be of a tandem type, as illustrated in FIG. 10. In this case, leaked gas from the fifth-stage compression unit 15 (high-pressure stage compression unit) flows into the fourth-stage compression unit 14 (low-pressure stage compression unit), and thus the pressure sensor 47 may be provided in the third connection pipe 33 (pipe connected to the suction valve of the low-pressure stage compression unit), for example. The discharge mechanism 45 in this case may be configured to discharge the hydrogen gas from the third connection pipe 33. Then, leaked gas from the third-stage compression unit 13 (high-pressure stage compression unit) flows into the second-stage compression unit 12 (low-pressure stage compression unit), and thus the pressure sensor 47 may be provided in the first connection pipe 31 (pipe connected to the suction valve of the low-pressure stage compression unit), for example. The discharge mechanism 45 in this case may be configured to discharge the hydrogen gas from the first connection pipe 31.

Figure 11:
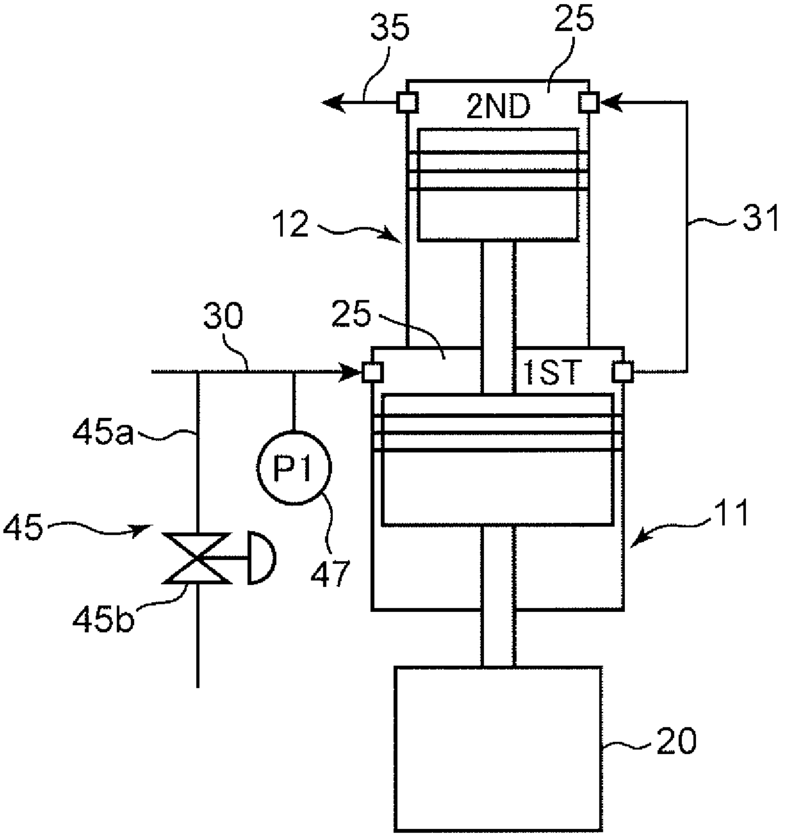
FIG. 11 is a diagram schematically illustrating a configuration of a reciprocating compressor according to yet another embodiment.

Although the reciprocating compressor 10 is configured as a multistage compressor including the fifth-stage compression units 11 to 15 in the above embodiments, the present embodiment is not limited thereto. The number of stages of the compression units may be two or more. When the number of stages is two, for example, the first-stage compression unit 11 and the second-stage compression unit 12 are configured in a tandem type as illustrated in FIG. 11. Then, leaked gas from the second-stage compression unit 12 (high-pressure stage compression unit) flows into the first-stage compression unit 11 (low-pressure stage compression unit), and thus the pressure sensor 47 is provided in the suction pipe 30 (pipe connected to the suction valve of the low-pressure stage compression unit), and the discharge mechanism 45 discharges hydrogen gas through the suction pipe 30.

Here, the embodiments will be outlined.

(1) A reciprocating compressor according to the corresponding embodiments for compressing hydrogen gas, includes: a low-pressure stage compression unit that includes a low-pressure stage piston, a low-pressure stage cylinder that houses the low-pressure stage piston, and a piston ring group attached to the low-pressure stage piston to compress the hydrogen gas; a high-pressure stage compression unit that includes a high-pressure stage piston connected to the low-pressure stage piston, a high-pressure stage cylinder that houses the high-pressure stage piston and is connected to the low-pressure stage cylinder, and a piston ring group attached to the high-pressure stage piston to compress the hydrogen gas after being compressed by the low-pressure stage compression unit; a drive unit for driving the high-pressure stage compression unit and the low-pressure stage compression unit; a discharge mechanism that allows the hydrogen gas to be discharged from a suction-side flow path that allows the hydrogen gas to flow to be suctioned into the low-pressure stage compression unit; a pressure sensor for detecting a pressure of the hydrogen gas suctioned into the low-pressure stage compression unit or a pressure of the hydrogen gas discharged from the low-pressure stage compression unit; and a discharge control unit for controlling the discharge mechanism to discharge the hydrogen gas from the suction-side flow path when the pressure of the hydrogen gas detected by the pressure sensor is higher than a set value preset.

The reciprocating compressor according to the corresponding embodiments may cause pressure of the hydrogen gas suctioned into the low-pressure stage compression unit or pressure of the hydrogen gas discharged from the low-pressure stage compression unit to be higher than the set value when the hydrogen gas leaks from the high-pressure stage compression unit to the low-pressure stage compression unit. In this case, the discharge mechanism discharges the hydrogen gas from the suction-side flow path. This configuration enables preventing an excessive increase in suction pressure of the low-pressure stage compression unit or discharge pressure of the low-pressure stage compression unit even when hydrogen gas leaks from the high-pressure stage compression unit to the low-pressure stage compression unit.

(2) The drive unit may include a motor that is rotatable. In this case, the reciprocating compressor may further include: an inverter capable of adjusting rotational speed of the motor in the drive unit; and a rotational speed control unit for controlling the inverter to increase the rotational speed of the motor in compensation for an amount of hydrogen gas discharged from the suction-side flow path when discharging hydrogen gas from the suction-side flow path.

This aspect allows the motor to increase its rotational speed to increase a discharge rate of the hydrogen gas with the low-pressure stage compression unit in compensation for the hydrogen gas discharged by the discharge mechanism. This enables suppressing a decrease in throughput of hydrogen gas with the reciprocating compressor. When the rotational speed of the motor is increased, the rotational speed of the motor of the drive unit that drives both the low-pressure stage compression unit and the high-pressure stage compression unit is increased. As a result, the discharge rate of the hydrogen gas increases in both the low-pressure stage compression unit and the high-pressure stage compression unit. Thus, even when the discharge rate of the hydrogen gas with the low-pressure stage compression unit increases, the discharge pressure of the low-pressure stage compression unit hardly increases.

(3) The pressure sensor may be located in the suction-side flow path. In this case, the discharge mechanism may include a gas discharge path connected to the suction-side flow path, and a discharge valve located in the gas discharge path and capable of adjusting a valve opening. The reciprocating compressor may further include an auxiliary pressure sensor located downstream of the discharge valve in the gas discharge path. The rotational speed control unit may be configured to increase rotational speed of the motor in compensation for the amount of the hydrogen gas corresponding to a discharge flow rate of the hydrogen gas derived based on a pressure detection value obtained by the pressure sensor, a pressure detection value obtained by the auxiliary pressure sensor, and flow rate characteristics of the discharge valve.

This aspect enables deriving the discharge flow rate of the hydrogen gas with the discharge mechanism while using the pressure sensor for detecting gas pressure in the suction-side flow path of the low-pressure stage compression unit.

(4) The discharge mechanism may include a gas discharge path connected to the suction-side flow path, an on-off valve located in the gas discharge path, and an orifice located downstream of the on-off valve in the gas discharge path. In this case, the reciprocating compressor may further include an auxiliary pressure sensor located downstream of the orifice in the gas discharge path. The rotational speed control unit may be configured to increase the rotational speed of the motor in compensation for the discharge flow rate of the hydrogen gas, the discharge flow rate being derived based on a pressure detection value obtained by the pressure sensor, a pressure detection value obtained by the auxiliary pressure sensor, and a throttle ratio of the gas discharge path, the throttle ratio being obtained by the orifice.

This aspect enables deriving the discharge flow rate of the hydrogen gas with the discharge mechanism while using the pressure sensor for detecting gas pressure in the suction-side flow path of the low-pressure stage compression unit.

(5) The reciprocating compressor discharges the hydrogen gas to a demander that may be an accumulator including a tank. The reciprocating compressor in this case may further include: a demand side pressure sensor located in the accumulator or in a demander connection flow path connecting the reciprocating compressor and the accumulator to each other; a demand side temperature sensor located in the accumulator or in the demander connection flow path; and an estimation unit for estimating a density variation per unit time of hydrogen gas accumulated in the accumulator based on a pressure detection value obtained by the demand side pressure sensor, a temperature detection value obtained by the demand side temperature sensor, and a tank capacity of the accumulator. The rotational speed control unit may be configured to increase rotational speed of the motor in compensation for the amount or a flow rate of the hydrogen gas corresponding to a difference between the density variation per unit time of the hydrogen gas accumulated in the accumulator on an assumption that there is no leakage of hydrogen gas from the high-pressure stage compression unit to the low-pressure stage compression unit and the density variation per unit time of the hydrogen gas estimated by the estimation unit.

This aspect enables preventing time for accumulating the hydrogen gas in the accumulator from increasing to more than assumed time even when the hydrogen gas leaks from the high-pressure stage compression unit to the low-pressure stage compression unit.

(6) A reciprocating compressor according to the corresponding embodiments for compressing hydrogen gas, includes: a low-pressure stage compression unit that includes a low-pressure stage piston, a low-pressure stage cylinder that houses the low-pressure stage piston, and a piston ring group attached to the low-pressure stage piston to compress the hydrogen gas; an intermediate-stage compression unit that compresses the hydrogen gas discharged from the low-pressure stage compression unit; a high-pressure stage compression unit that includes a high-pressure stage piston connected to the low-pressure stage piston, a high-pressure stage cylinder that houses the high-pressure stage piston and is connected to the low-pressure stage cylinder, and a piston ring group attached to the high-pressure stage piston to compress the hydrogen gas discharged from the intermediate-stage compression unit; a drive unit for driving the low-pressure stage compression unit, the intermediate-stage compression unit, and the high-pressure stage compression unit; a discharge mechanism that allows the hydrogen gas to be discharged from a suction-side flow path that allows the hydrogen gas to flow to be suctioned into the low-pressure stage compression unit; a pressure sensor for detecting a pressure of the hydrogen gas suctioned into the low-pressure stage compression unit, a pressure of the hydrogen gas discharged from the low-pressure stage compression unit and suctioned into the intermediate-stage compression unit, or a pressure of the hydrogen gas discharged from the intermediate-stage compression unit and suctioned into the high-pressure stage compression unit; and a discharge control unit for controlling the discharge mechanism to discharge the hydrogen gas from the suction-side flow path when the pressure of the hydrogen gas detected by the pressure sensor is higher than a set value preset.

The reciprocating compressor according to the corresponding embodiments may cause pressure of the hydrogen gas suctioned into the low-pressure stage compression unit, pressure of the hydrogen gas discharged from the low-pressure stage compression unit (or suction pressure of the intermediate-stage compression unit), or pressure of the hydrogen gas suctioned into the high-pressure stage compression unit (or discharge pressure of the intermediate-stage compression unit) to be higher than the set value when the hydrogen gas leaks from the high-pressure stage compression unit to the low-pressure stage compression unit. In this case, the discharge mechanism discharges the hydrogen gas from the suction-side flow path. This configuration enables preventing an excessive increase in suction pressure of the low-pressure stage compression unit, discharge pressure of the low-pressure stage compression unit (or suction pressure of the intermediate-stage compression unit), and suction pressure of the high-pressure stage compression unit (or discharge pressure of the intermediate-stage compression unit) even when hydrogen gas leaks from the high-pressure stage compression unit to the low-pressure state compression unit.

As described above, excessive increase in suction pressure of a compression unit on a low-pressure side (discharge pressure of a compression unit at a stage immediately before the compression unit on the low-pressure side) can be prevented even when hydrogen gas leaks from the compression unit to the compression unit on the low-pressure side.

This application is based on Japanese Patent Application No. 2022-018826 filed on Feb. 9, 2022, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A reciprocating compressor for compressing hydrogen gas, the reciprocating compressor comprising:

a low-pressure stage compression unit that includes a low-pressure stage piston, a low-pressure stage cylinder that houses the low-pressure stage piston, and a piston ring group attached to the low-pressure stage piston to compress hydrogen gas;

a high-pressure stage compression unit that includes a high-pressure stage piston connected to the low-pressure stage piston, a high-pressure stage cylinder that houses the high-pressure stage piston and is connected to the low-pressure stage cylinder, and a piston ring group attached to the high-pressure stage piston to compress hydrogen gas after being compressed by the low-pressure stage compression unit;

a drive unit for driving the high-pressure stage compression unit and the low-pressure stage compression unit;

a discharger that allows hydrogen gas to be discharged from a suction-side flow path that allows hydrogen gas to flow to be suctioned into the low-pressure stage compression unit;

a pressure sensor for detecting a pressure of hydrogen gas suctioned into the low-pressure stage compression unit or a pressure of hydrogen gas discharged from the low-pressure stage compression unit; and a discharge control unit for controlling the discharger to discharge hydrogen gas from the suction-side flow path when the pressure of hydrogen gas detected by the pressure sensor is higher than a set value preset;

wherein the set value is a predetermined normal pressure value of hydrogen gas suctioned into the low-pressure stage compression unit when a differential pressure between a pressure in the suction-side flow path and a pressure in a compression chamber of the low-pressure stage compression unit reaches a predetermined pressure value to open a suction valve of the low-pressure stage compression unit, or the set value is a predetermined normal pressure value of hydrogen gas discharged from the low-pressure stage compression unit.

2. A reciprocating compressor for compressing hydrogen gas, the reciprocating compressor comprising:

a low-pressure stage compression unit that includes a low-pressure stage piston, a low-pressure stage cylinder that houses the low-pressure stage piston, and a piston ring group attached to the low-pressure stage piston to compress hydrogen gas;

a high-pressure stage compression unit that includes a high-pressure stage piston connected to the low-pressure stage piston, a high-pressure stage cylinder that houses the high-pressure stage piston and is connected to the low-pressure stage cylinder, and a piston ring group attached to the high-pressure stage piston to compress hydrogen gas after being compressed by the low-pressure stage compression unit;

a drive unit for driving the high-pressure stage compression unit and the low-pressure stage compression unit;

a discharger that allows hydrogen gas to be discharged from a suction-side flow path that allows hydrogen gas to flow to be suctioned into the low-pressure stage compression unit;

a pressure sensor for detecting a pressure of hydrogen gas suctioned into the low-pressure stage compression unit or a pressure of hydrogen gas discharged from the low-pressure stage compression unit; and a discharge control unit for controlling the discharger to discharge hydrogen gas from the suction-side flow path when the pressure of hydrogen gas detected by the pressure sensor is higher than a set value preset;

wherein the drive unit includes a motor that is rotatable; and the reciprocating compressor further comprises:

an inverter capable of adjusting rotational speed of the motor in the drive unit; and a rotational speed control unit for controlling the inverter to increase the rotational speed of the motor in compensation for an amount of hydrogen gas discharged from the suction-side flow path when discharging hydrogen gas from the suction-side flow path.

3. The reciprocating compressor according to claim 2, wherein the pressure sensor is located in the suction-side flow path, wherein the discharger includes a gas discharge path connected to the suction-side flow path and a discharge valve located in the gas discharge path and capable of adjusting a valve opening;

wherein the reciprocating compressor further comprises:

an auxiliary pressure sensor located downstream of the discharge valve in the gas discharge path, and wherein the rotational speed control unit is configured to increase rotational speed of the motor in compensation for the amount of hydrogen gas corresponding to a discharge flow rate of hydrogen gas derived based on a pressure detection value obtained by the pressure sensor, a pressure detection value obtained by the auxiliary pressure sensor, and flow rate characteristics of the discharge valve.

4. The reciprocating compressor according to claim 2, wherein the discharger includes a gas discharge path connected to the suction-side flow path, an on-off valve located in the gas discharge path, and an orifice located downstream of the on-off valve in the gas discharge path;

wherein the reciprocating compressor further comprises:

an auxiliary pressure sensor located downstream of the orifice in the gas discharge path, and wherein the rotational speed control unit is configured to increase the rotational speed of the motor in compensation for a discharge flow rate of hydrogen gas, the discharge flow rate being derived based on a pressure detection value obtained by the pressure sensor, a pressure detection value obtained by the auxiliary pressure sensor, and a throttle ratio of the gas discharge path, the throttle ratio being obtained by the orifice.

5. The reciprocating compressor according to claim 2, wherein a demander to which the hydrogen gas is discharged from the reciprocating compressor is an accumulator including a tank;

wherein the reciprocating compressor further comprises:

a demand side pressure sensor located in the accumulator or in a demander connection flow path connecting the reciprocating compressor and the accumulator to each other;

a demand side temperature sensor located in the accumulator or in the demander connection flow path; and an estimation unit for estimating a density variation per unit time of hydrogen gas accumulated in the accumulator based on a pressure detection value obtained by the demand side pressure sensor, a temperature detection value obtained by the demand side temperature sensor, and a tank capacity of the accumulator, and wherein the rotational speed control unit is configured to increase rotational speed of the motor in compensation for the amount or a flow rate of hydrogen gas corresponding to a difference between the density variation per unit time of hydrogen gas accumulated in the accumulator on an assumption that there is no leakage of hydrogen gas from the high-pressure stage compression unit to the low-pressure stage compression unit and the density variation per unit time of hydrogen gas estimated by the estimation unit.

6. A reciprocating compressor for compressing hydrogen gas, the reciprocating compressor comprising:

a low-pressure stage compression unit that includes a low-pressure stage piston, a low-pressure stage cylinder that houses the low-pressure stage piston, and a piston ring group attached to the low-pressure stage piston to compress hydrogen gas;

an intermediate-stage compression unit for compressing hydrogen gas discharged from the low-pressure stage compression unit;

a high-pressure stage compression unit that includes a high-pressure stage piston connected to the low-pressure stage piston, a high-pressure stage cylinder that houses the high-pressure stage piston and is connected to the low-pressure stage cylinder, and a piston ring group attached to the high-pressure stage piston to compress hydrogen gas discharged from the intermediate-stage compression unit;

a drive unit for driving the low-pressure stage compression unit, the intermediate-stage compression unit, and the high-pressure stage compression unit;

a discharger that allows hydrogen gas to be discharged from a suction-side flow path that allows hydrogen gas to flow to be suctioned into the low-pressure stage compression unit;

a pressure sensor for detecting a pressure of hydrogen gas suctioned into the low-pressure stage compression unit, a pressure of hydrogen gas discharged from the low-pressure stage compression unit and suctioned into the intermediate-stage compression unit, or a pressure of hydrogen gas discharged from the intermediate-stage compression unit and suctioned into the high-pressure stage compression unit; and a discharge control unit for controlling the discharger to discharge the hydrogen gas from the suction-side flow path when the pressure of the hydrogen gas detected by the pressure sensor is higher than a set value preset;

wherein the set value is a predetermined normal pressure value of hydrogen gas suctioned into the low-pressure stage compression unit when a differential pressure between a pressure in the suction-side flow path and a pressure in a compression chamber of the low-pressure stage compression unit reaches a predetermined pressure value to open a suction valve of the low-pressure stage compression unit, or the set value is a predetermined normal pressure value of hydrogen gas discharged from the low-pressure stage compression unit, or the set value is a predetermined normal pressure value of hydrogen gas suctioned into the high-pressure stage compression unit.

* * * * *